United States Patent [19]

Anderson et al.

[11] 4,169,240
[45] Sep. 25, 1979

[54] AUTOMATIC FOCUSSING SYSTEMS

[75] Inventors: John D. Anderson, Burwell; John F. Watney, Cambridge; Peter I. Tillett, Comberton, all of England

[73] Assignee: Cambridge Scientific Instruments Limited, Hertfordshire, England

[21] Appl. No.: 820,914

[22] Filed: Aug. 1, 1977

[30] Foreign Application Priority Data

Jul. 30, 1976 [GB] United Kingdom ............... 31809/76

[51] Int. Cl.² ............................................. H01J 29/58
[52] U.S. Cl. .................................... 315/382; 250/311; 250/396 R
[58] Field of Search ............. 315/382, 31 R; 250/311, 250/347, 348, 396 R, 396 ML

[56] References Cited
FOREIGN PATENT DOCUMENTS 1477030 6/1977 United Kingdom.

*Primary Examiner*—Theodore M. Blum
*Attorney, Agent, or Firm*—Oblon, Fisher, Spivak, McClelland & Maier

[57] ABSTRACT

An automatic focusing system is described for use with scanning systems having a poor signal to noise ratio video signal obtained by repetitive scanning. Typically the system is applicable to a scanning electron microscope.

A preliminary filtering of the video signal is performed using a filter which eliminates video signal content corresponding to the fundamental and low harmonics of the repetitive scanning.

Basic noise reduction is achieved using an N-path filter (typically N=8) commutated at a frequency equal to N×line repetition frequency of the electron beam scanning. The output signal is rectified and averaged to give a d.c. level proportional to the high frequency content of the video signal clustered around harmonics of the line scan repetition rate. This d.c. level is maximized by making stepwise adjustments in the current flowing in the focusing coil of the electron beam scanner and comparing d.c. levels before and after adjustment.

Because of the attenuation of the N-path filter to signal content above 4×the commutation frequency, a low pass filter having a cut off frequency of about 4×the commutation frequency is incorporated, in the preliminary filtering. This effects a further reduction in the noise content in the signal which is supplied to the rectifying and averaging circuit.

8 Claims, 16 Drawing Figures

$\dfrac{d}{T} = \dfrac{1}{8}$

AUTOMATIC FOCUSSING SYSTEMS

FIELD OF THE INVENTION

This invention concerns automatic focusing systems primarily for use with scanning electron microscopes and like instruments.

BACKGROUND TO THE INVENTION

It is a characteristic of most automatic focusing systems which are applied to opto/electronic imaging systems where a video signal is produced by scanning, that the high frequency content of the video signal is picked out (usually by filtering or by differentiation) and a signal indicating the resulting high frequency content used as an indication of the quality of focus of the image which is being scanned. Unfortunately electrical noise is inherently present in video signals to a greater or lesser degree and even in a well focused image the high frequency content may be of commensurate or even less amplitude than the electrical noise signal still present after filtering or differentiation. In this event it is virtually impossible to use the high frequency signal information and automatic focusing systems are therefore limited to applications where the high frequency content of the video signal is sufficiently great that it can be distinguished from electrical noise in the filtered video signal.

Scanning electron microscopes and similar instruments are usually required to work over a large range of signal to noise ratios and it is because of this that automatic focusing techniques have rarely met with much success when applied to such instruments. Whilst the automatic focusing systems can be made to operate on well defined high contrast images the signal to noise ratio of the signal obtained from typical images seen by such instruments is such as to prevent a good signal to noise ratio from being obtained so that it is difficult and usually impossible to obtain a focus indication signal by filtering or differentiation in the usual way.

Prior Art

British Pat. No. 1,477,030 to Nikon Denshi K. K. discusses the problem of applying automatic focusing the systems such as scanning electron microscopes in which the video signal obtained by the scanning has a very low signal to noise ratio. A system is described which avoids the use of a differentiation of the video signal and which concentrates on summing the video signal transitions betweel local peaks and troughs of the video signal wave form over discrete time intervals (typically the line scan periods) so that the noise content on the video signal is "lost" in the summation or integration process. It is to be noted that for this prior system to work the field must contain features which are below the resolving power of the microscope at all focal positions since the system relies on a difference existing between the integration over successive time intervals, with appropriate adjustment of focus between integrations, and this can only occur near the focus condition if there are still features in the field which are small relative to the spot size. The system does not appear to be capable of working on an isolated feature.

OBJECT OF THE INVENTION

It is an object of the present invention to provide an improved automatic focusing system in which a signal is derived which indicates the state of focus of the image and which is not adversely affected by a poor signal to noise ratio of the video signal.

THE INVENTION

According to the present invention, in an automatic focussing system for controlling the size of a scanning spot which is employed to produce a video signal and in which a state of focus signal is obtained from the video signal, there is provided the improvement comprising: filter means for filtering the high frequency content of the video signal from the overall video signal, said filter means having a lower cut off frequency such that at least signal content having a frequency equal to the frequency of the repetitive scanning rate is substantially absent from the filtered video signal; an N-path filter circuit to which the filtered signal is supplied; and circuit means for producing an average value of the signal from the N-path filter, the average value signal so obtained comprising the said state of focus signal.

Preferably amplifier means is provided for amplifying the filtered signal to compensate for losses in the filter circuit.

The N-path filter achieves a pseudo-multiplication of the components of the filtered video signal on the one hand with the fundamental and any harmonics of the commutating signal supplied thereto.

Typically the frequency of the signal by which the N-path filter is commutated is equal to N x the repetitive scanning frequency.

The level of the state of focus signal will normally vary depending upon the point in the raster from which the video signal is being derived at any instant and preferably the state of focus signal is integrated over a plurality of consecutive time periods such as complete frame scans to provide a mean state of focus signal for those frame scans.

When applied to an electron microscope, means is preferably provided for automatically reverting the scanning of the electron microscope to a television scan rate and the magnification to a given value (typically 1000× magnification) before the automatic focusing procedure is started.

The invention relies on the fact that most of the picture information in the video signal is in fact clustered around the fundamental and harmonics of the repetitive scanning rate (i.e., line scan frequency in a television scanning system). An N-path (or comb) filter which is commutated by a signal equal to N× the repetitive scan frequency will attenuate signals which are not clustered around the fundamental and harmonics of the repetitive scan frequency. On the other hand electrical noise trends have a broad spectrum of frequency and is not generally clustered in narrow side bands around the line scan repetition frequency or harmonics thereof, and consequently the comb-like response of the N-path filter will severely attenuate all the electrical noise which does not happen to fall within the sidebands of the repetitive frequency.

The response of an N-path filter is such that no output occurs at frequencies equal to the commutating frequency and harmonics thereof and considerable attenuation of the signal supplied to the filter occurs above the fourth harmonic of the commutating frequency. To this end a further reduction in noise content can be achieved by introducing a low pass filter in series with the high pass filter, having a cut off frequency equal to approximately 4× the commutating frequency.

Preferably the phase of the N-path filter commutating signal is modulated repetitively during each frame scan with signals derived from the frame blanking signals.

The invention will now be described by way of example with reference to the accompanying drawings in which.

GENERAL DESCRIPTION OF THE CONSTRUCTION AND OPERATION OF THE EMBODIMENT

The drawings illustrate an embodiment of the invention as applied to a scanning electron microscope (not shown) in which the focus is adjusted by adjusting the magnitude of the final lens current, the latter being controlled by the numerical value of a digital signal which is generated by a first circuit or counter and which is normally supplied to and stored in a digital store, the numerical value (and therefore the lens current) being increased or decreased by adding or subtracting unit electrical pulses to or from the digital signal to incrementally increase or decrease the signal, so that the lens current can be altered in incremental steps.

At the outset of a focusing process, the numerical value of the digital signal is reduced to zero (or its maximum value) and the store is cleared. The lens current is then increased (or decreased) incrementally by increasing (or decreasing) the numerical value of the signal in steps until the maximum (or minimum) value of the lens current is obtained. A mean state of focus signal is obtained at each step and each mean state of focus signal is compared with the previous one and the comparator is adapted always to select the higher value and cause it to be stored. A second store is provided so that the numerical value of the digital signal controlling the lens current can be stored. The numerical value of the digital signal which corresponds to the higher value state of focus signal always takes precedence over the lower numerical value of the digital signal, so that at the end of a complete sweep of lens current the current value corresponding to the best state of focus signal detected will be stored in the second store, and this can be used to control the lens current value to obtain optimum focus.

The selection of this lens current to give optimum focus may be achieved in two stages. A first selection may be made using a large unit pulse for increasing or decreasing the lens current in steps to make an initial selection as described. With the lens current set to the first selected value, a second selection is made using smaller steps. After incrementing the lens current using these small steps and a closely controlled feedback system, a new value of lens current is determined corresponding to a new finely adjusted position of focus. At that point a STOP signal is generated to inhibit further selection and thereby prevent hunting.

The success of the invention is the vastly improved signal to noise ratio that is obtained by using an N-path filter to remove video signal components except those in the region of the harmonics of the line scan signals. The N-path filter output signal is maximised to indicate the best position of focus.

Although the N-path filter can be thought of as producing a mathematical multiplication of two signals, when applied to a video signal obtained by repetitive scanning of a field, the N-path filter, (when commutated the N× the line scan frequency) can be thought of as dividing the scanned area into a plurality of vertical columns, the number of columns being equivalent to the number of paths in the filter. Since the circuits following the N-path filter will be responsive to changes of amplitude as between one path and the next as the filter is commutated, a greater sensitivity can be obtained in the line scan direction by increasing the number of paths through the filter. If only a few paths are provided so that the scanned area is divided into only a small number of columns, each of the columns will as a corollary correspond to a considerable percentage of the line scan length and if the field is composed of a large number of small features (such that the length dimension of the features in the line scan direction is small relative to the column width as defined by the N-path filter) then it is conceivable that a large number of the features will each fall wholly between vertical lines defining columns with the consequent loss of edge information signal content from such features. It is thus important that the column widths produced by the N-path filter are not too great having regard to the size of the features and to this end the magnification of the field is most conveniently adjusted to an appropriate value so that an appropriate relationship exists between the size of the features and the widths of the columns.

DETAILED DESCRIPTION OF THE DRAWINGS

Figure 1:
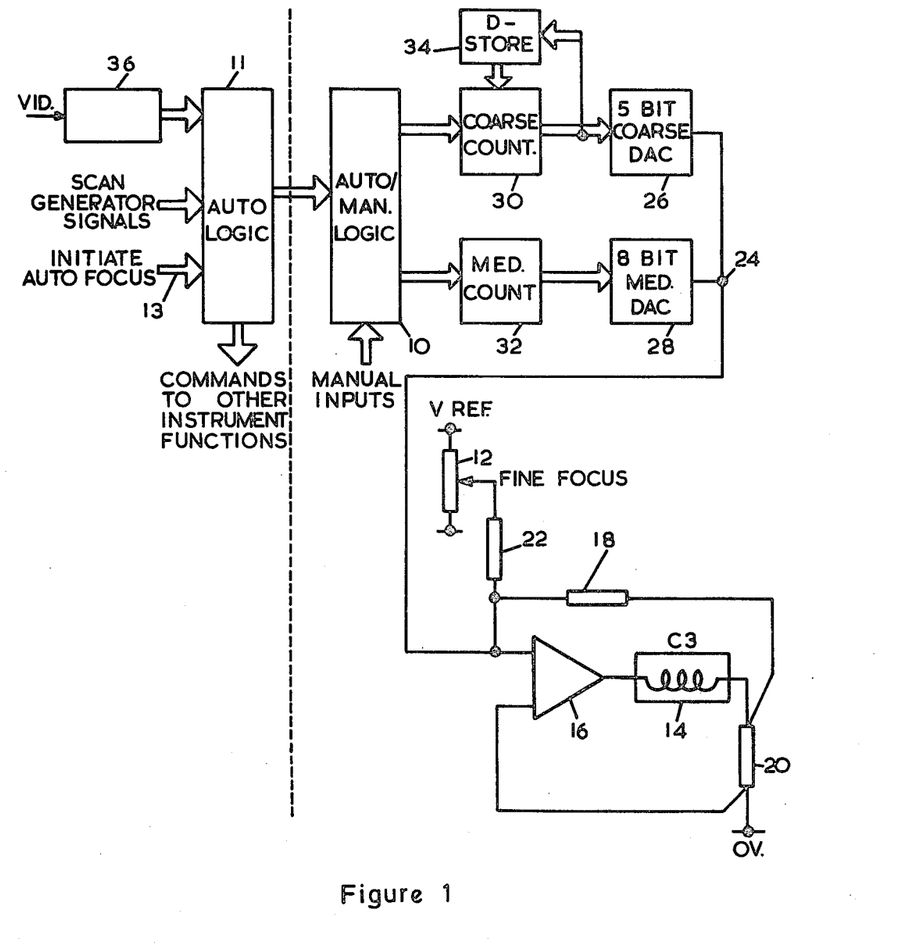
FIG. 1 is a schematic diagram showing the constituent parts of an automatic focusing system suitable for use with a scanning electron microscope.

FIG. 1 shows the main building blocks of a combined automatic and manual focusing control system for a scanning electron microscope or similar device (not shown). The manual controls (not shown) comprise a coarse step control and a medium step control which produce control signals for a logic circuit 10 which can also be controlled via an auto control logic stage 11, and a third control 12, in the form of a potentiometer or similar device which allows fine adjustments to be made in the actual current flowing through the focusing coil 14.

The coarse and medium step controls are rendered inoperable when the logic circuit 10 is switched to automatic operation but it will be seen that the fine focus control 12 is always available so that final adjustment of the current (and therefore focus) is always available to the operator.

The coil 14 is conveniently the final condenser lens of the scanning electron microscope (not shown) and this is supplied by a conventional high stability current source comprising a high gain amplifier 16 having feed back resistors 18 and 20. An input to the amplifier 16 is controlled by the output of the control system (whether operated in the manual or automatic mode). The current from the fine focus control 12 which forms part of the control system is also applied to the amplifier 16 input via resistor 22.

The control circuit can be thought of as having two outputs which are supplied via the common junction 24 to the input of amplifier 16 so that the latter can be thought of as being supplied from three separate sources corresponding to coarse, medium and fine focusing. The course and medium control signals are derived digitally and to this end the analogue signals for the amplifier 16 are generated by a 5-bit digital to analogue (DA) converter 26 for the coarse mode of operation and an 8-bit (DA) converter 28 for the medium mode of operation. Since the fine focus control signal is derived from a potentiometer 12 no (DA) converter is needed in that line.

Typically the fine focus potentiometer spans approximately 8 of the medium steps and the medium mode spans approximately four of the coarse steps.

Each DA converter 26, 28 is driven by an up-down counter 30, 32. The coarse step counter 30 can be reloaded as described later from a digital store 34.

VIDEO PROCESSOR

The video processor 36 in FIG. 1 derives the signal from the unprocessed video signal obtained by scanning the field with the electron beam. As a result of an analysis of the spectral responses obtained when scanning typical fields the following requirements were established as being necessary for the video processor 36.

1. The processor must have a comb filter response locked to TV line frequency so as to reject as much noise as possible.
2. The notch width should be about 500 Hz so as to capture a few 50 Hz sidebands.
3. The processor should exclude the fundamental and harmonics up to approximately the fourth harmonic of the line repetition frequency as signal content is found to be strong even in a severely out of focus condition at these frequencies.
4. The processor should reject harmonics corresponding to frequencies above 500 KHz when dealing with out of focus condition video signals since the singal to noise ratio above that frequency is found to be very poor.

Figure 2:
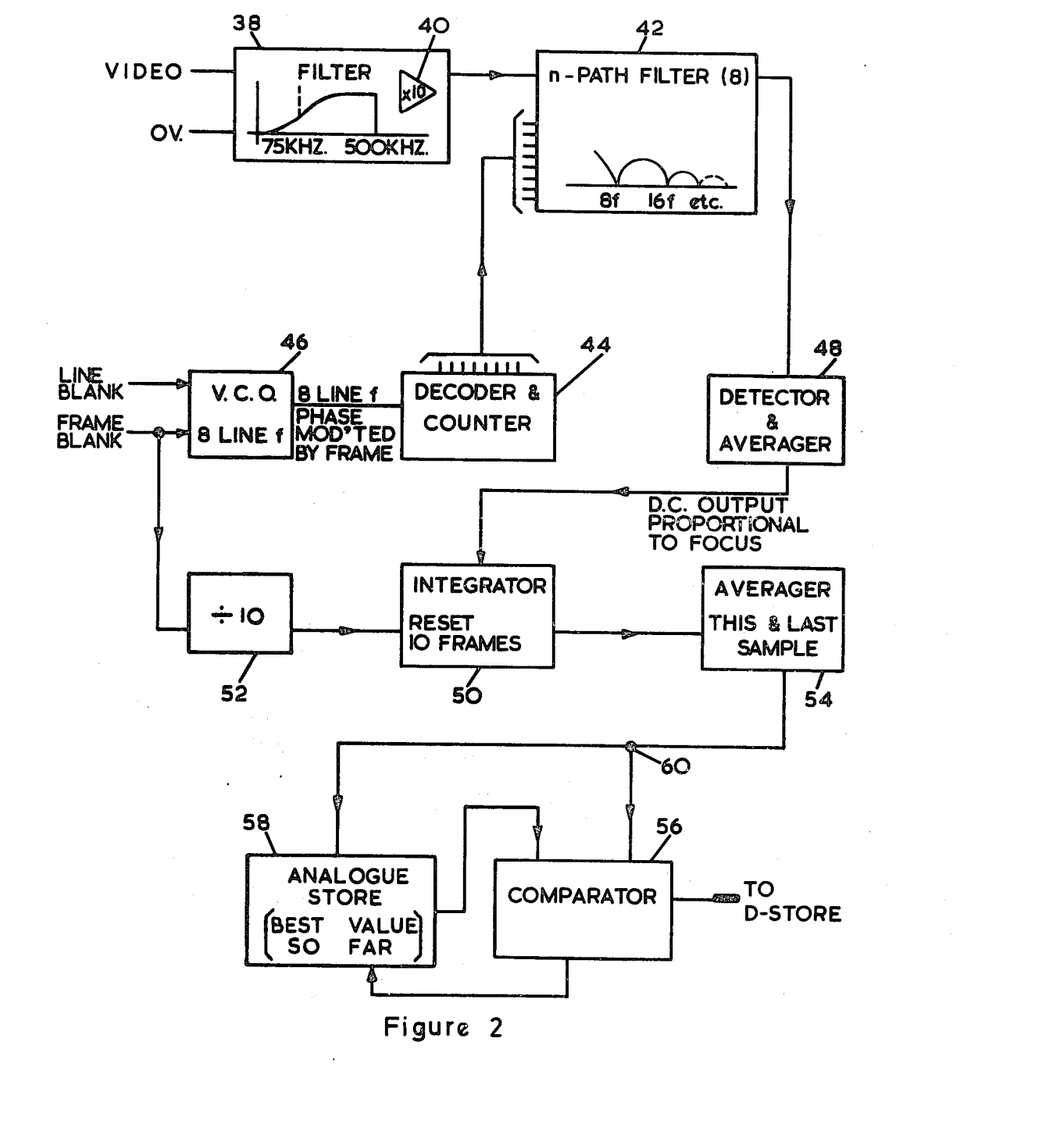
FIG. 2 is a block circuit diagram of the signal processing section of the focusing system shown in FIG. 1.

FIG. 2 illustrates the block circuit diagram of the processor 36. This comprises a filter 38 the characteristics and design of which will be discussed with reference to FIG. 3. Either incorporated into the filter 38 or separately, an amplifier 40 is provided to compensate for attenuation within the filter 38. Typically the amplifier has a gain of 10.

The output from the amplifier constitutes one input to an N-path filter circuit 42 (see FIGS. 4 to 7).

The system described is intended to operate at TV scan rates but if a very poor signal to noise ratio exists the scan rates can be reduced with consequent adjustment of the commutation frequency of the N-path filter and the high and low cut-off frequencies of the filter.

The commutating input to the N-path filter 42 is obtained from a decoder and counter 44 which is supplied with a signal at N times the line frequency from a modulating stage 46. In the embodiment described N is assumed to be 8 (i.e., there are 8 paths through the filter 42 which are commutated in sequence during each line scan period) so that the signal supplied by the modulating stage 46 is basically at 8 times line frequency. The modulating stage 46 will be described in more detail with reference to FIG. 9 but essentially comprises a circuit which modulates the phase of the 8 times line frequency signal during each frame scan using signals derived from the frame blanking signals and to this end the circuit 46 is shown as provided with two input signals one from the line blanking pulses and the other from the frame blanking pulses.

The output from the N-path filter 42 is supplied to a detector and averaging circuit 48 the detector section of which essentially comprises a full wave rectifying circuit, to produce a direct current output which is proportional to the average focus of the image.

With very low signal condition, such as when a very small spot size is required, the signal to noise ratio is improved by integrating the output from circuit 48 using integrator circuit 50, which is typically set to integrate for 10 frames. A re-set signal for the integrator circuit 50 is derived by a divide by 10 circuit 52 supplied with frame blanking pulses.

A second averaging circuit 54 is supplied with the integrator output at the end of each integration period. The circuit 54 passes the integrator output signal when the coarse clock operates (see later) but otherwise stores the output signal last supplied to it so as to produce an average of the current and previous integrator output signals. Each average signal so produced constitutes one input to a comparator 56 and an input to an analogue store 58 which is controlled by the comparator to either accept the new signal at junction 60 in place of the one previously stored or to reject the signal at 60 is favour of the signal already in the store 58.

Comparator 56 operates so as to distinguish between the new average signal at 60 and the value from the store 58. If the signal at 60 is of greater value than that in the store 58 then the new value is transferred into the store in place of the signal already in the store, but if the signal at 60 is smaller than the value in the store the latter is held as being the best value so far.

The comparator transfers the higher of the two values into the D store 34 previously referred to, so as to control the value of the coarse counter 30.

VIDEO FILTERING ARRANGEMENT

Figure 3:
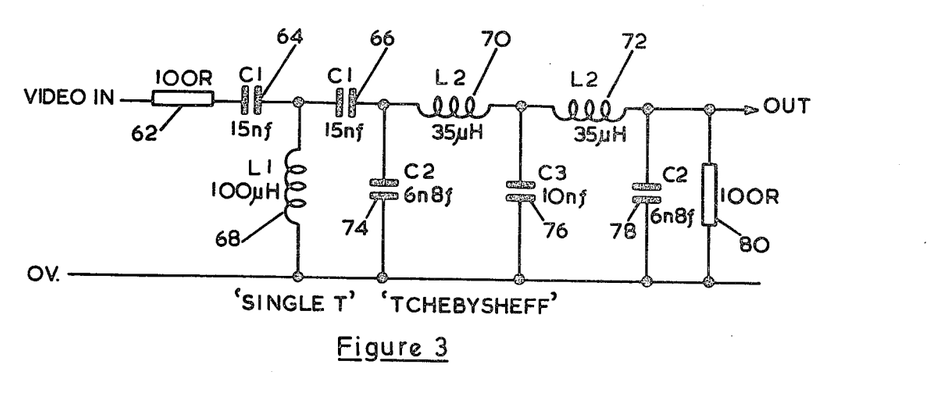
FIG. 3 is a circuit diagram of a preferred form of filter as incorporated in the processing circuit of FIG. 2.

The filter 38 of FIG. 2 is shown in detail in FIG. 3. The purpose of the filter is to remove the fundamental and first four harmonics of the line repetition frequency (assumed to be 15 KHz) and to remove all frequencies over approximately 500 KHz. The high pass filter is formed by 100 ohm resistor 62, a T-section filter formed by two capacitors 64 and 66 and a single inductor 68. The T-section filter constitutes a high pass filter and is used to attenuate the fundamental and lower harmonics of the line repetition frequency video signal components.

The T-filter is followed by a Tchebysheff filter made up of two series connected inductors 70 and 72 and three capacitors 74, 76 and 78. The Tchebysheff filter is terminated by a 100 ohm resistor 80 from which the output is taken to an amplifier 40 (see FIG. 2).

Values for the various inductors and capacitors are given in the drawing so as to give a sharp cutoff below 75 KHz and a sharp cutoff above 500 KHz. The overall transfer characteristic for the combination of the T and Tchebysheff filters is thus a band pass between 75 and 500 KHz.

THE N-PATH FILTER

Figure 4:
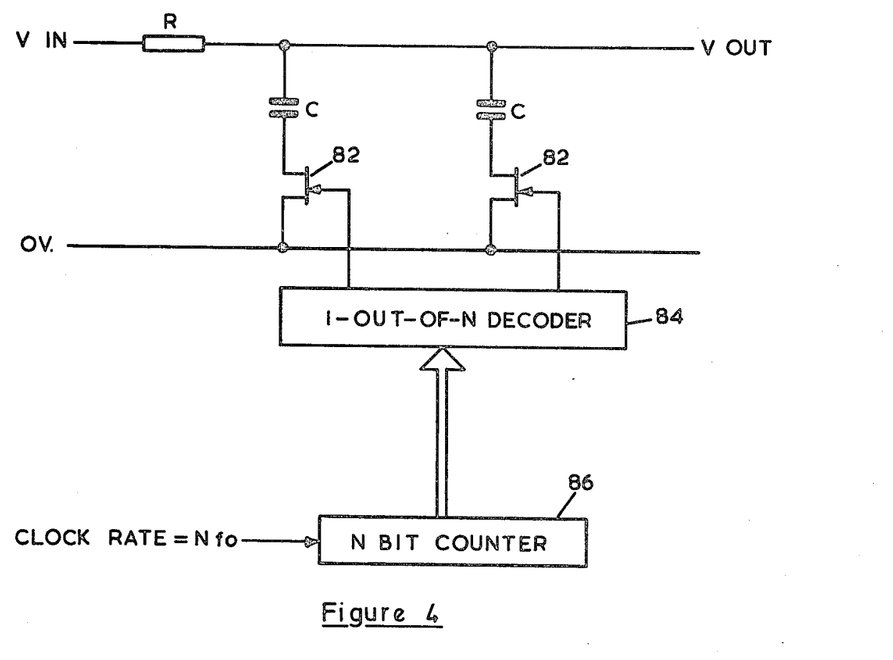
FIG. 4 is a part circuit and part schematic diagram of an N-path filter as incorporated in the circuit of FIG. 2.

FIG. 4 illustrates the form of the N-path filter 42 of FIG. 2.

Input to the filter passes through a series resistor R and the N-different paths are made up of an appropriate number of capacitors C in series with field effect transistors generally designated 82. Each of the transistors 82 is controlled by one of the outputs from a decoder 84 which is in turn supplied with the output from an N bit counter 86. The action of the decoder 84 is to present a control pulse at each of its N outputs in turn and the N bit counter is driven by a clock signal having a frequency $N \times f_o$ where $f_o$ is the line scan repetition rate.

Where N=8 each line scan can be thought of as being divided into 8 segments. The filtered video signal is integrated during each line scan segment, the integration of the signal on each of the capacitors C being increased or decreased during corresponding line scan segments on following line scans, so as to build up on the capacitors C a charge pattern which will vary in the frame scan direction depending on the positions of the edges of the features which are tangential to the line scan direction.

Figure 5:
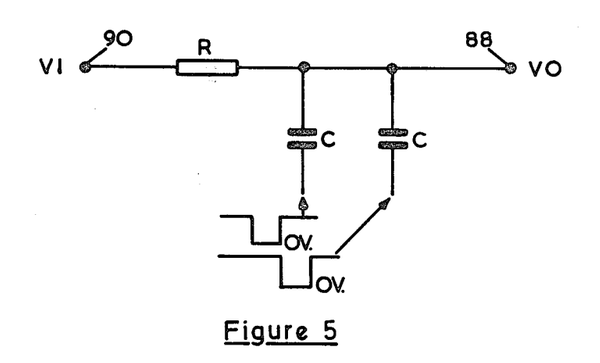
FIG. 5 is a circuit showing the manner in which the different capacitor sections of the N-path filter of FIG. 4 are commutated.
Figure 6:
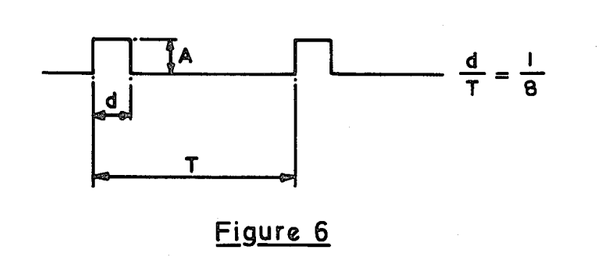
FIG. 6 is a graphical representation of the wave form of the signals supplied to control the commutation of the N-path filter.

The operation of the N path filter will be seen by reference to FIG. 5 which illustrates the waveform of the voltage on the lower plates of one of the capacitors C which changes as its field effect transistor 82 is switched.

If Vo is the output voltage at junction 88 and V1 is the input voltage at junction 90 then it can be shown that:

$$\frac{V_o}{V_1} = \sum_{o}^{\infty} C_n \sin Nwt$$

$$\text{where } C_n = \frac{A}{4} \cdot \frac{\sin\left(\frac{n\pi}{8}\right)}{\left(\frac{n\pi}{8}\right)}$$

The N path filter is a sampling system where the input voltage V1 is effectively multiplied by the sampling voltage. The ratio of the width of the pulses controlling the commutation of the capacitors C to the total period of commutation (equal to one line scan period) is 1:8. This is demonstrated in FIG. 6.

Figure 7:
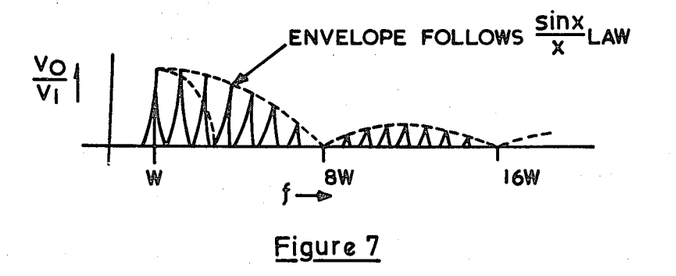
FIG. 7 is the spectrum response of attenuation against frequency for the N-path filter discussed in relation to FIGS. 5 and 6.

The effective bandwidth per response is 1/RC and this results in a spectrum response for the N path filter as shown in FIG. 7. The envelope follows the so-called (sin x/x) law.

As the filter commutation (i.e., the switching of the transistors 82 in FIG. 4) is locked to the line frequency (or a harmonic thereof) it is also phase locked to the video signal. This is unfortunate as it could be that the system might lock on to a certain phase of the video signal which is at or near zero volts with the result that the output would be near to zero. To this end the input to the N bit counter 86 is phase modulated by approximately ±60° at field frequency (i.e., frame scanning rate frequency) so as to overcome this problem.

Figure 9:
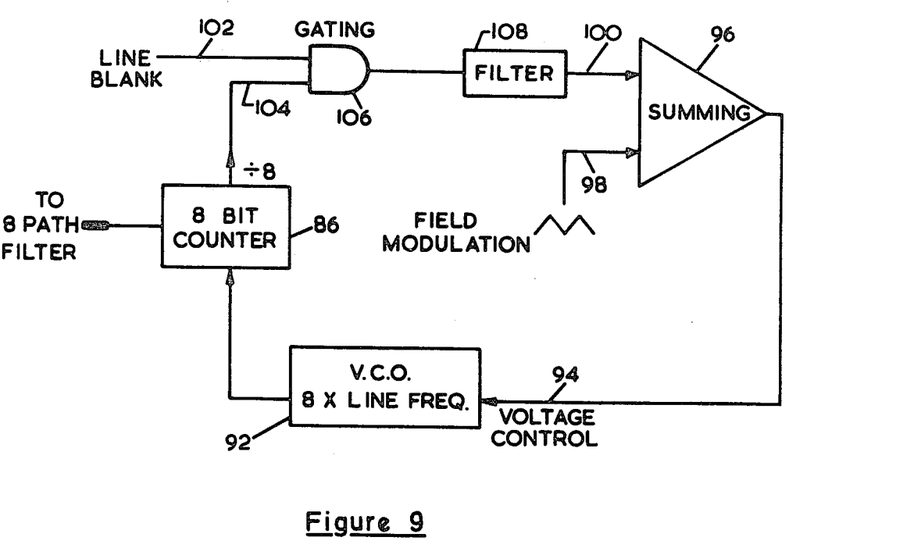
FIG. 9 is a block circuit diagram of the modulation stage contained in the circuit of FIG. 8.

This has already been mentioned in the description of FIG. 2 and details of the circuit 46 are shown in FIG. 9.

Relating this to FIG. 4, the 8-bit counter 86 (which forms part of the decoder and counter unit 44 of FIG. 2) is supplied with a signal at 8-times line frequency from voltage controlled oscillator circuit 92, the phase of which is controlled by the voltage control signal on line 94. The voltage control on line 94 is derived from a summing amplifier 96 having a first input from line 98 comprising triangular waveform pulses derived from the frame blanking signals and a second input from line 100 which is derived by gating the line blanking signals on line 102 and the last output 104 of the 8-bit counter 86 by an AND gate 106, the output of which is filtered by a low-pass filter 108 before being applied to the summing amplifier 96. The purpose of the AND gate 106 and the second input to the summing amplifier 96 is to provide a loop lock.

The frequency of the voltage controlled oscillator circuit 92 is thus varied in frequency depending on the value of the control voltage 94 which in turn varies according to the putput of the summing amplifier 96 so that the phase of the commutation signal from the 8-bit counter 86 to the N path filter is varied during each frame scan period.

FOCUS SEARCH SYSTEM

Figure 8:
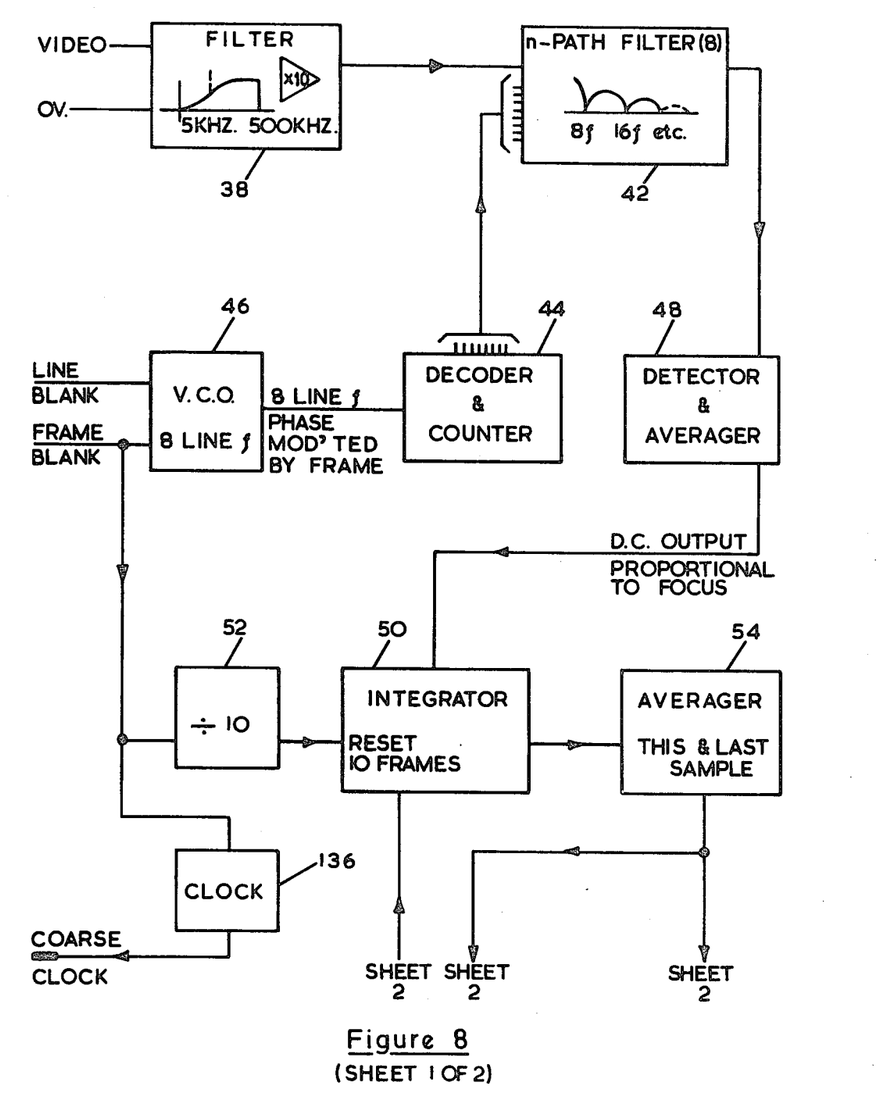
FIG. 8 is a block circuit diagram of the signal processing circuits and logic circuits which derive the state of focus signal and other control signals within the overall system shown in FIG. 1.

FIG. 8 is a block circuit diagram of the system which has been drawn so as to demonstrate how the system searches for the in focus position.

In order to avoid settling on a noise spike or other unwanted peak in the focus signal and to obviate the lengthy process of clocking every single lens current step, automatic focusing is commenced by stepping the focusing current from its maximum value to its minimum value through 32 coarse steps derived from counter 30 and DA converter 26 (see FIG. 1). This provides an over view of the entire focal range and enables the system to decide to within two or three course steps, the value of the focusing current which corresponds to the highest average value of the state of focus signal. The counter value for this highest average value is stored in the D-store at the end of the over view.

Intimately related to this process is the sharpness of the peak itself which can easily be missed if it is too narrow i.e., if the magnification which has been selected is too high. It has been found in practice that a magnification of approximately 1000 times will produce a peak in the state of focus signal which when plotted against focus current will comfortably straddle the gap between two focus settings as determined by the coarse steps from the DA converter 26.

FIG. 8 breaks down the automatic control or steering logic 11 into functional blocks. The general scheme is that after the 32 steps forming the overview, the best value for the focus current (±1 coarse step) is held in the D store 34 (see FIG. 1).

Due to the response of the system the value in the D-store must correspond to a lens current which is below the in-focus current since the position of best coarse focus must be passed to be detected.

The D-store value is shifted to the counter 30, and held, and the medium step counter 32 is operated in an up direction in coarse steps each corresponding to four medium bits, until a new best value is detected by comparator 56. The reversal from better to worse as the new best value is detected, triggers flip flop 110 which in turn triggers mono stable circuit 112 which reverses the direction of the medium counter 32 via up down flip flop 116 and alters the step size of the medium counter from 4-bits to 1-bit steps via a direction change counter 114 and input to the medium clock 118 via line 120.

With the medium clock now operating at 1-bit steps and in the reverse direction, a new best value is again searched for and detected by a comparator 56. Since as before it is assumed that the best value has to be exceeded before it can be detected by comparator 56, the circuit also provides that the medium counter is back stepped by 1-bit when the final best value is detected. The device by which this back-stepping is achieved will be described in more detail later.

The output from the comparator 56 is supplied to the flip flop circuit 110 which indicates whether the signal which has been compared is better or worse (i.e., higher or lower) than the best value stored in the store 58. The output from the flip flop 110 triggers the mono stable device 112 to produce the pulses for the direction change counter 114 and the up-down flip flop device 116.

The medium clock 118 is a pulse producing circuit which generates the control pulses for counter 32 (see FIG. 1) and is in turn controlled by the direction change counter 114.

Operation of the focus search system can best be understood by considering the sequence of operations following an initiation of an automatic focusing search.

To this end the auto focus initiate switch 122 is shown in FIG. 8 and this constitutes the in-put 13 to the logic control circuit 11 (see FIG. 1).

The switch 122 triggers a mono stable circuit 124 when it is operated which generates a clearing signal on lines 126 for clearing the stores and counters and a trigger signal on line 128 for a bistable circuit 130. The bistable device 130 produces an end of auto-focus signal ($\overline{AF}$) on line 132 when it is re-set by a pulse from direction change counter 114 on line 134.

At the beginning of the search, the direction change counter 114 registers zero and the medium clock is operated to insert a middle range value into the medium counter 32.

The coarse clock 136 (see FIG. 8) is initiated and the overview performed to provide the best approximate value for the coarse counter in D store 34.

As previously described, at the first "better to worse" transition during the over-view, flip flop 110 and mono stable 112 provide the first pulses for up-down flip flop 116 and direction change counter 114. Flip flop 51 is triggered to hold the coarse counter 30 at the D store value and to enable the medium clock.

At the second "better to worse" transition, flip flop 110 and mono stable 112 produce the second pulse to reverse the flip flop 116 and register a second change in counter 114. The first count in 114 causes the medium clock 118 to step the counter 32 with 4-bit steps and the second count in counter 114 causes the medium clock 118 to step the counter 32 with 1-bit steps.

The third "better to worse" transition detected using the 1-bit steps from the medium counter also produces a pulse in the out-put of mono stable 112 which produces the third count for 114 which re-sets bistable 130 to produce the end of auto-focus signal ($\overline{AF}$) which terminates operation of the circuit except for a final pulse along line 120 to the medium clock 118. Since the flip flop 116 has been reversed once again by the last pulse from the mono stable 112 this final pulse via the clock 118 back-steps counter 32 by 1-bit to give the final lens current control signal at junction 24 in FIG. 1.

This value is held until the auto-focus initiate switch 112 is operated again.

Figure 10:
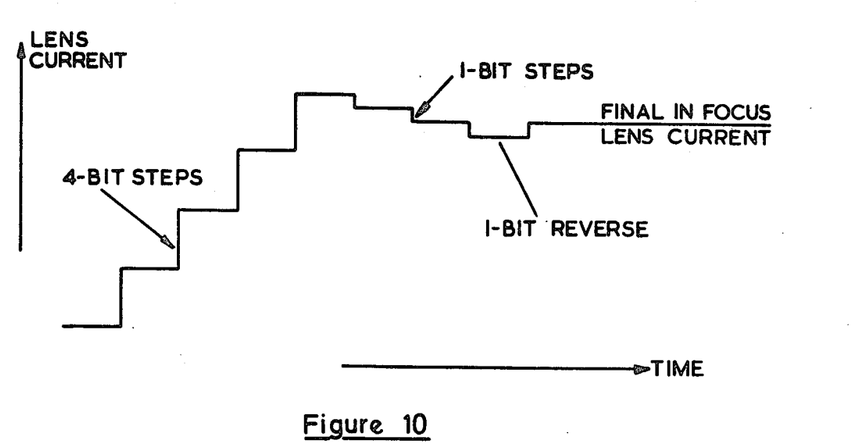
FIG. 10 is a graphical representation of the lens current versus time as the position of focus is neared and achieved, and FIGS. 11 A, B, C and D are circuit diagrams of one embodiment of an automatic focusing system embodying the invention.
Figure 11A:
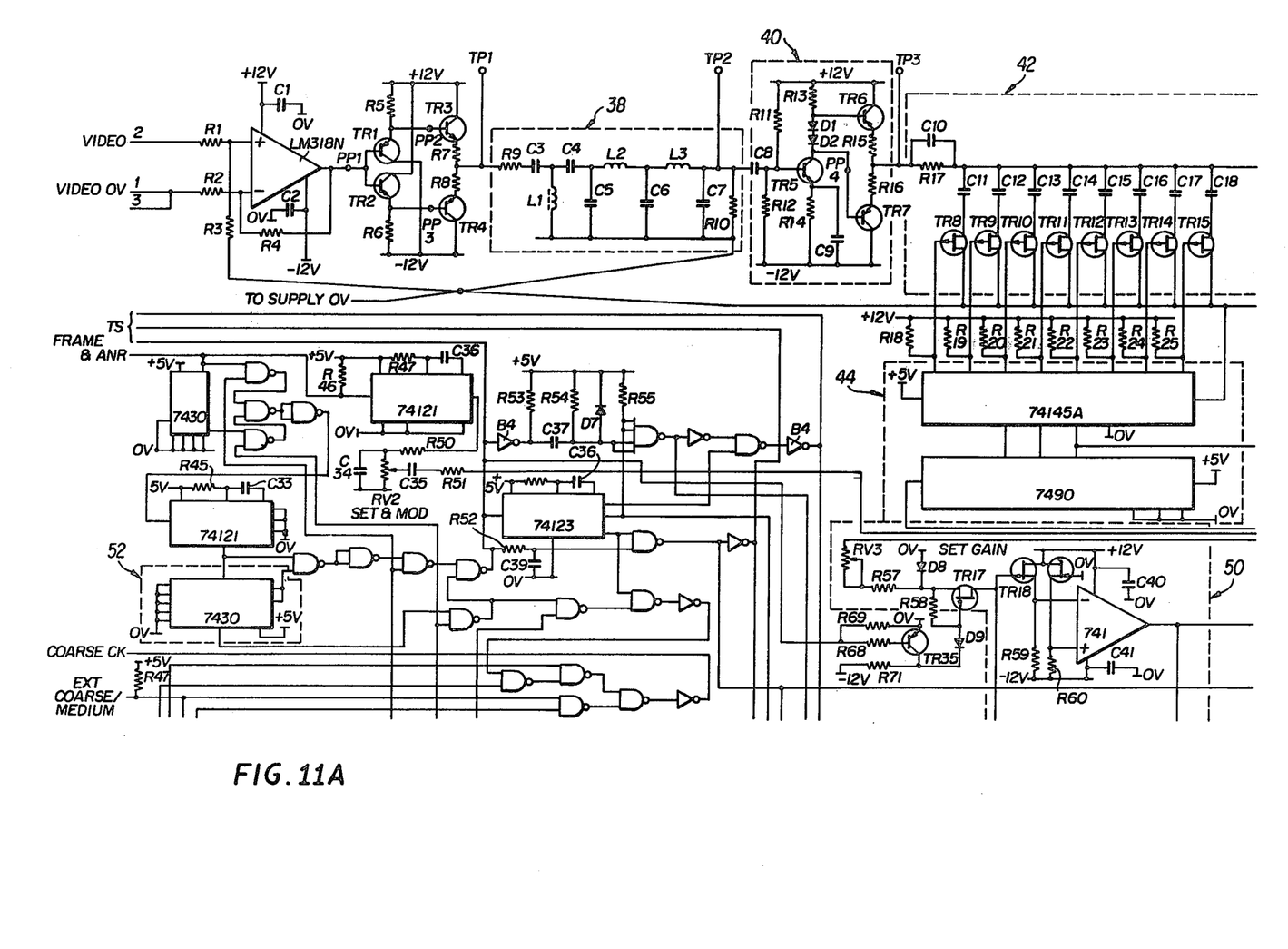
Figure 11B:
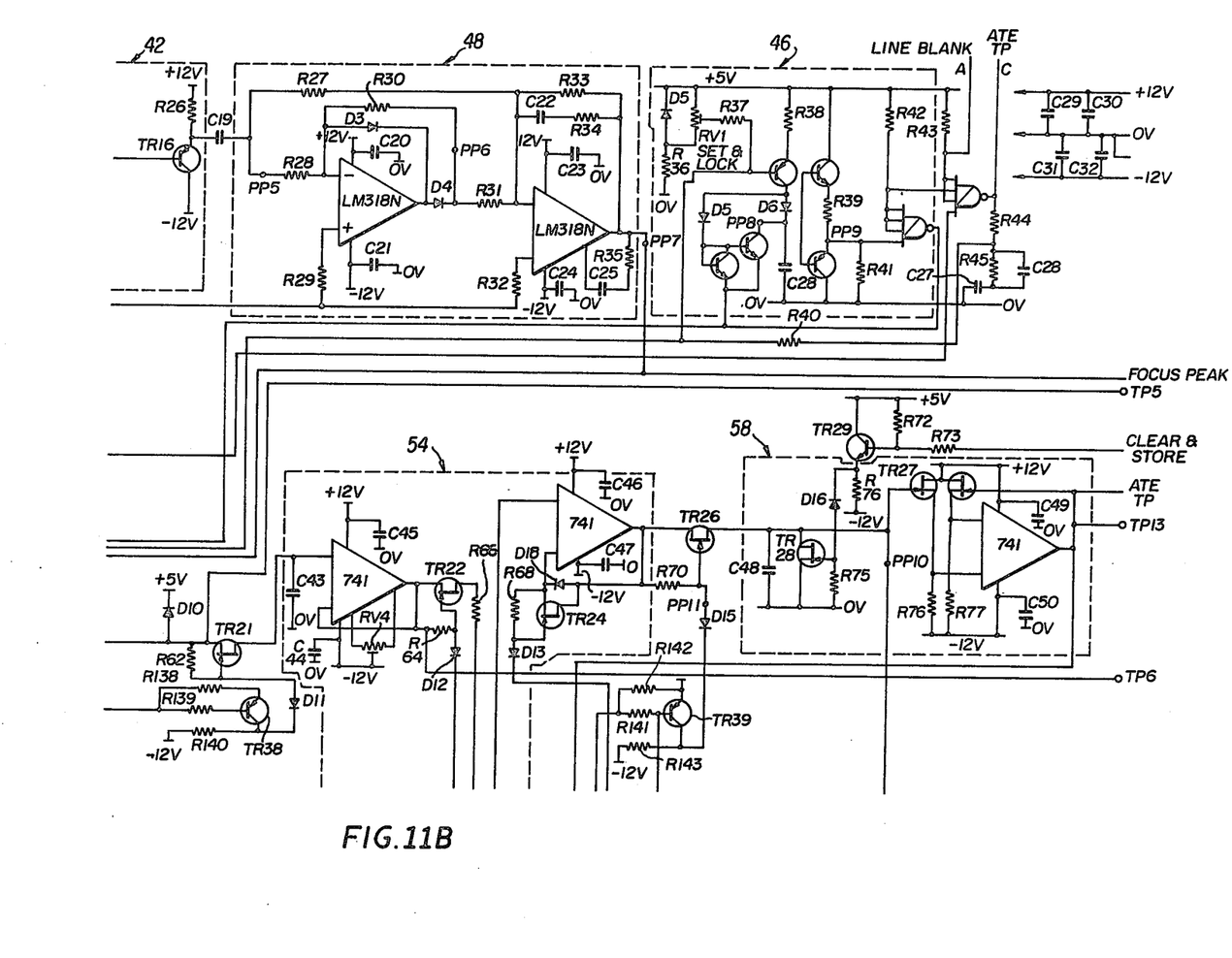
Figure 11C:
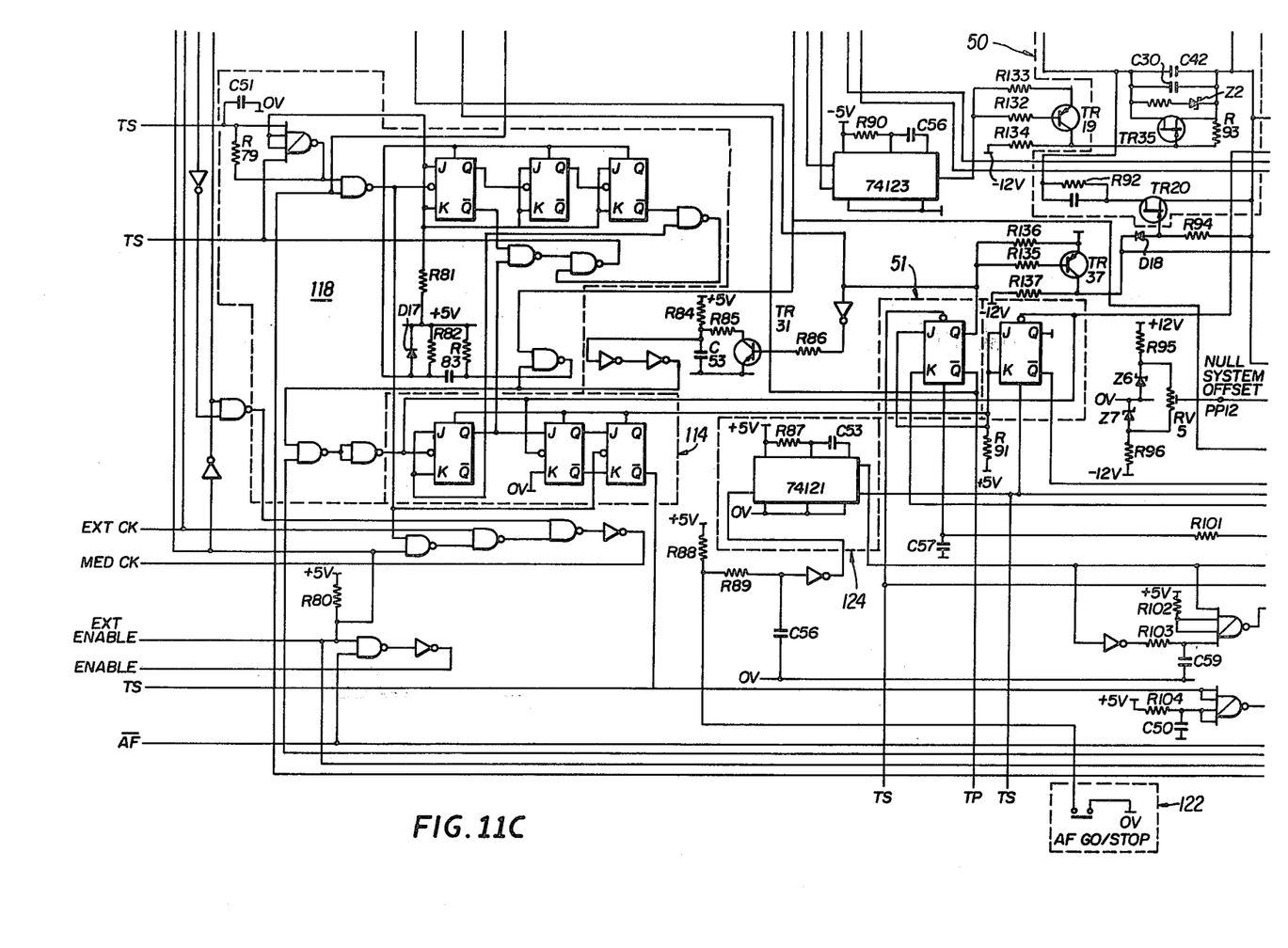
Figure 11D:
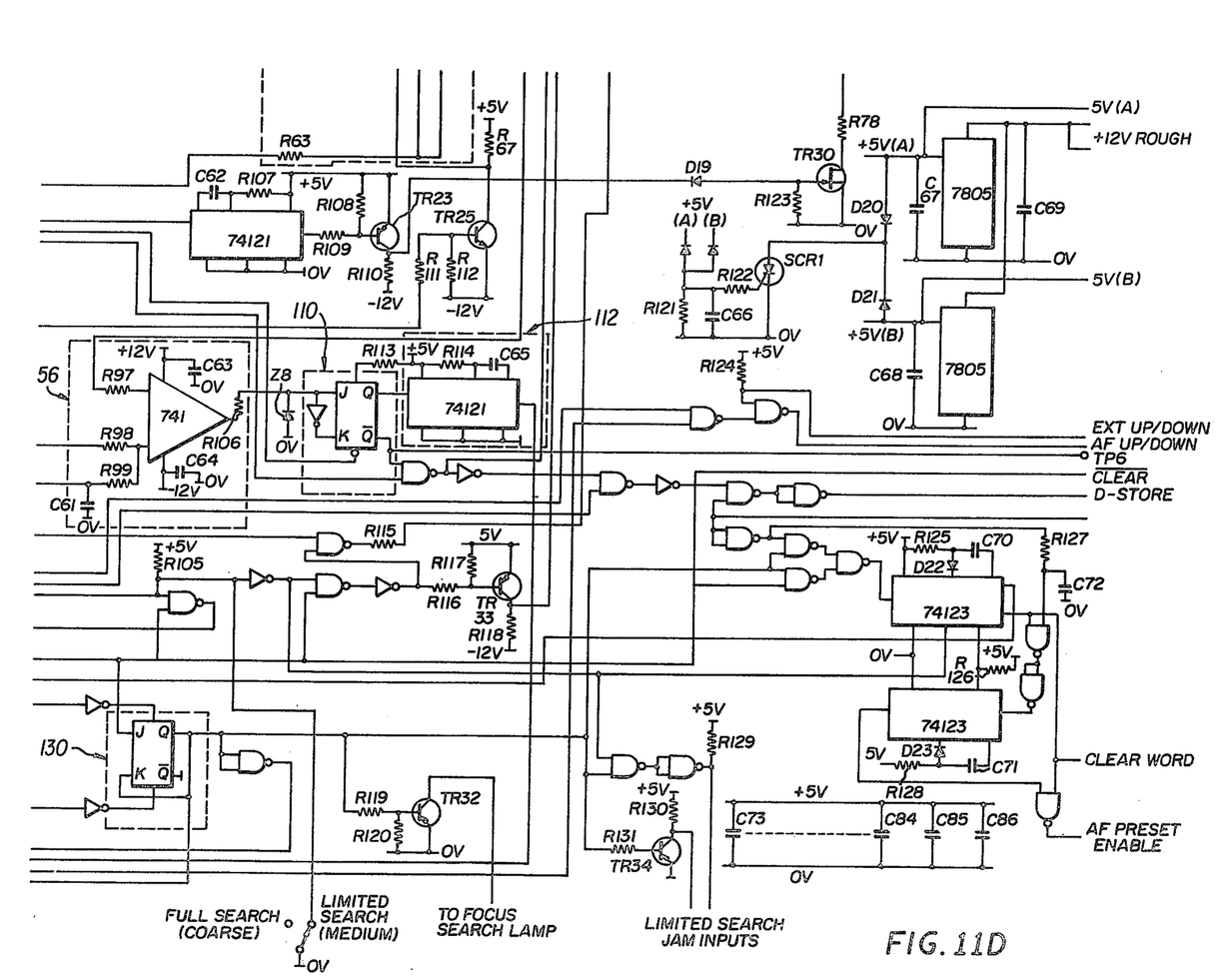
Figure 11E:
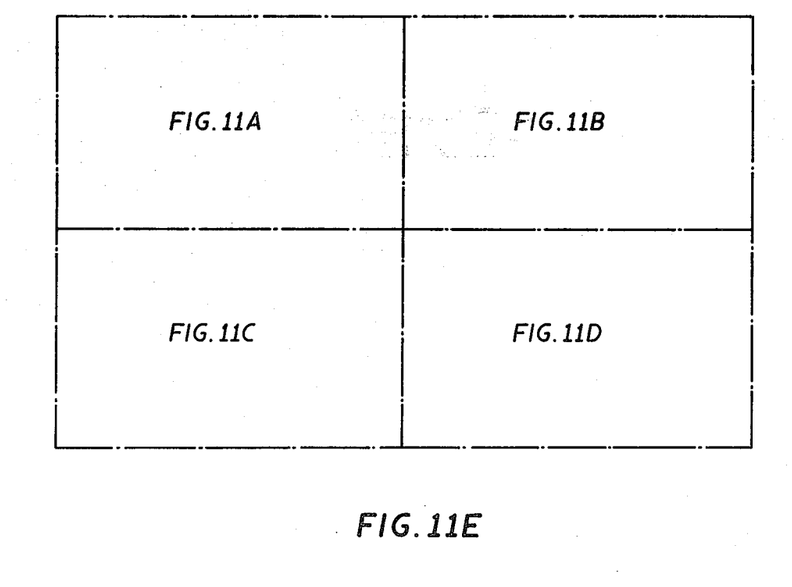
FIG. 11E is a schematic illustration of the interrelationship of the circuits of FIGS. 11A–11D.

FIG. 10 illustrates the signals from the medium step counter 32, initially 4-bit steps increasing until the peak is passed after which the clock circuit 118 causes it to produce single step count pulses in the down direction until the third reversal when it is assumed that the system is in focus and the counter is back stepped by 1-bit from the direction change counter 114.

Fine variation of the focus control signal at junction 24 can be achieved by adjustment of the fine focus control 12.

FIGS. 11 A, B, C, D and E are full circuit diagrams of the complete automatic focusing system parts of which have been described individually with reference to FIGS. 1 to 10. The major sections of the circuit which correspond to the separate parts in the block circuit diagram of FIGS. 1–9 are identified as such in the full circuit diagram and since the logic types are marked on the full circuit diagram, it is believed that the operation of the circuit shown in FIG. 11 will be quite clear when read in conjunction with the description of FIGS. 1 to 9.

We claim:

1. An automatic focusing system for controlling the size of a scanning spot which is repetitively scanned across a field to produce a video signal and in which a state of focus signal is obtained from the video signal, comprising in combination:
   filter means for filtering the high frequency content of the video signal from the overall video signal, said filter means having a lower cut off frequency such that at least signal content having a frequency equal to the frequency of the repetitive scanning rate is substantially absent from the filtered video signal;
   an N-path filter circuit to which the filtered signal is supplied; and
   circuit means for producing an average value of the signal from the N-path filter, the average value signal so obtained comprising the said state of focus signal.

2. An automatic focusing system as set forth in claim 1 further comprising amplifier means for amplifying the filtered signal to compensate for losses in the filter means.

3. An automatic focusing system as set forth in claim 1 further comprising integrating circuit means for integrating the state of focus signal over a plurality of consecutive time periods to provide a mean state of focus signal.

4. An automatic focusing system as set forth in claim 3 further comprising,
   means effecting step by step changes in the focus of the scanning spot,
   storage means for storing each mean state of focus signal value until a new mean state of focus signal is derived following a change in the focus of the scanning spot, comparator means for comparing the value of the stored mean state of focus signal with the value of each new mean state of focus signal and selecting the best of each two mean state of focus signals, means for controlling the magnitude and direction of the stepwise changes in the focus, and means for preventing further operation of the system when no improvement in the state of focus signal can be detected, using the smallest available stepwise changes in focus.

5. An automatic focusing system as set forth in claim 1 in combination with an electron microscope having control means for automatically reverting the scanning of the electron microscope to a television scan rate and the magnification of the microscope to a given value before the automatic focusing procedure is started.

6. An automatic focusing system as set forth in claim 1 where the said filter means includes a low pass filter having a cut off frequency in the region of the fourth harmonic of the signal employed to commutate the N-path filter so that the overall characteristic of the said filter means is that of a band pass filter.

7. An automatic focusing system as set forth in claim 1 further comprising circuit means for producing a modulation of the frequency of the signal supplied to commutate the N-path filter, the commutating signal whereby being modulated on phase repetitively.

8. An automatic focusing system as set forth in claim 7 wherein the commutating signal is modulated by signals derived from the frame blanking signals.

* * * * *